April 27, 1937.  C. F. BRANNOCK  2,078,368
FOOT MEASURING INSTRUMENT
Filed Dec. 13, 1934   3 Sheets-Sheet 1
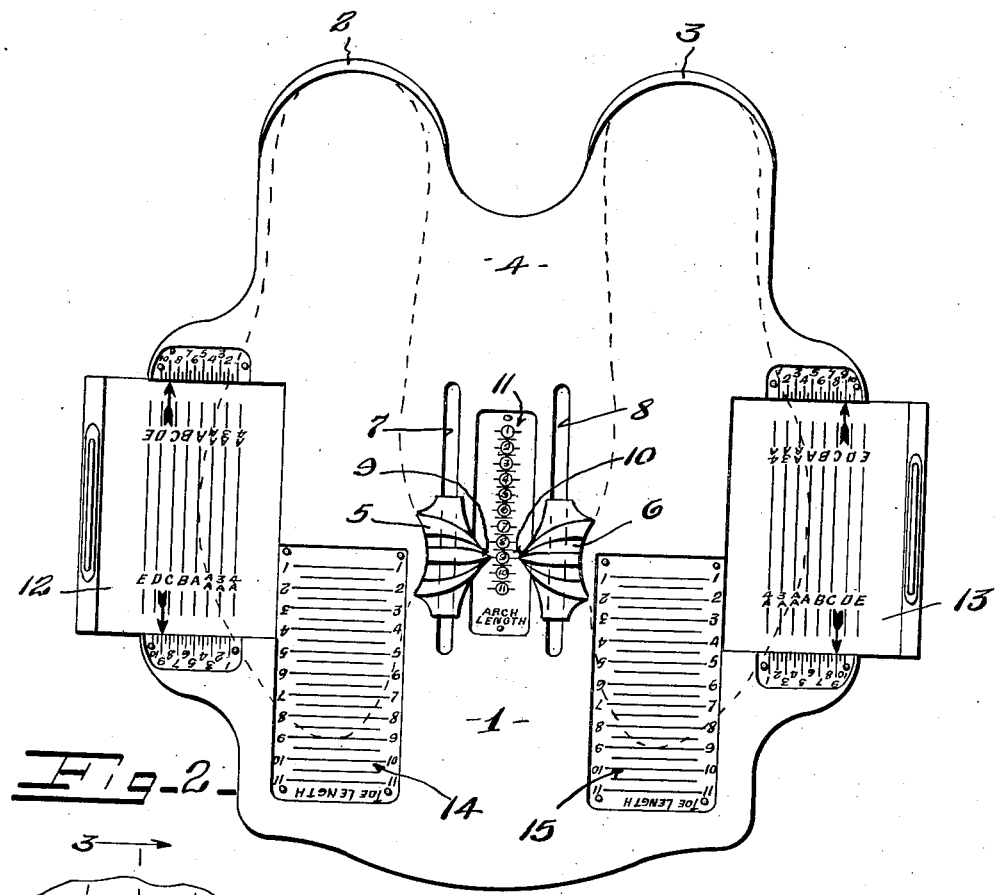
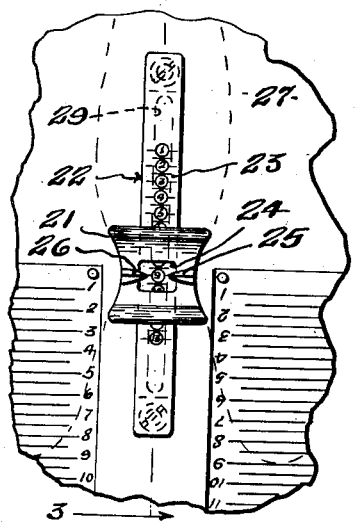
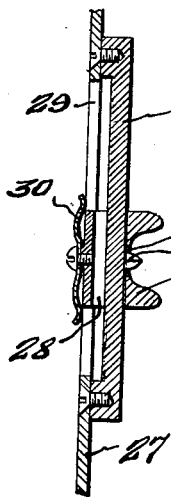
INVENTOR.
Charles F. Brannock
BY
ATTORNEYS.

April 27, 1937.  C. F. BRANNOCK  2,078,368
FOOT MEASURING INSTRUMENT
Filed Dec. 13, 1934  3 Sheets—Sheet 2
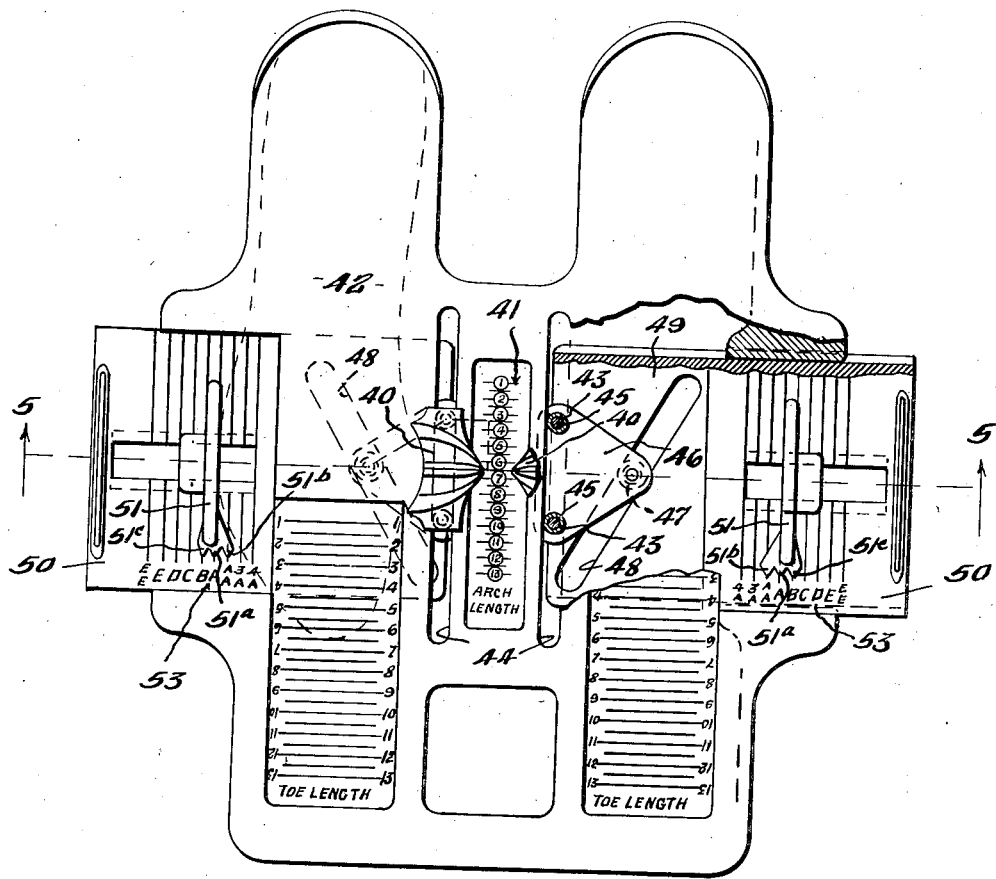
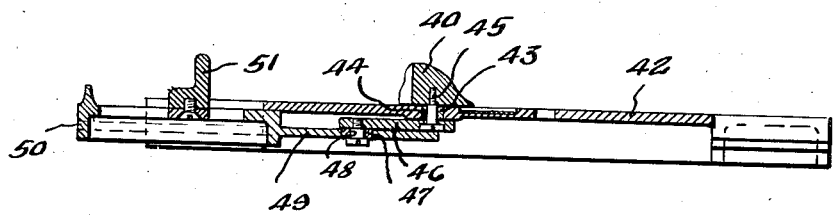
INVENTOR.
Charles F. Brannock.
BY
Wendell P. Thompson
ATTORNEYS.

April 27, 1937.   C. F. BRANNOCK   2,078,368
FOOT MEASURING INSTRUMENT
Filed Dec. 13, 1934   3 Sheets-Sheet 3
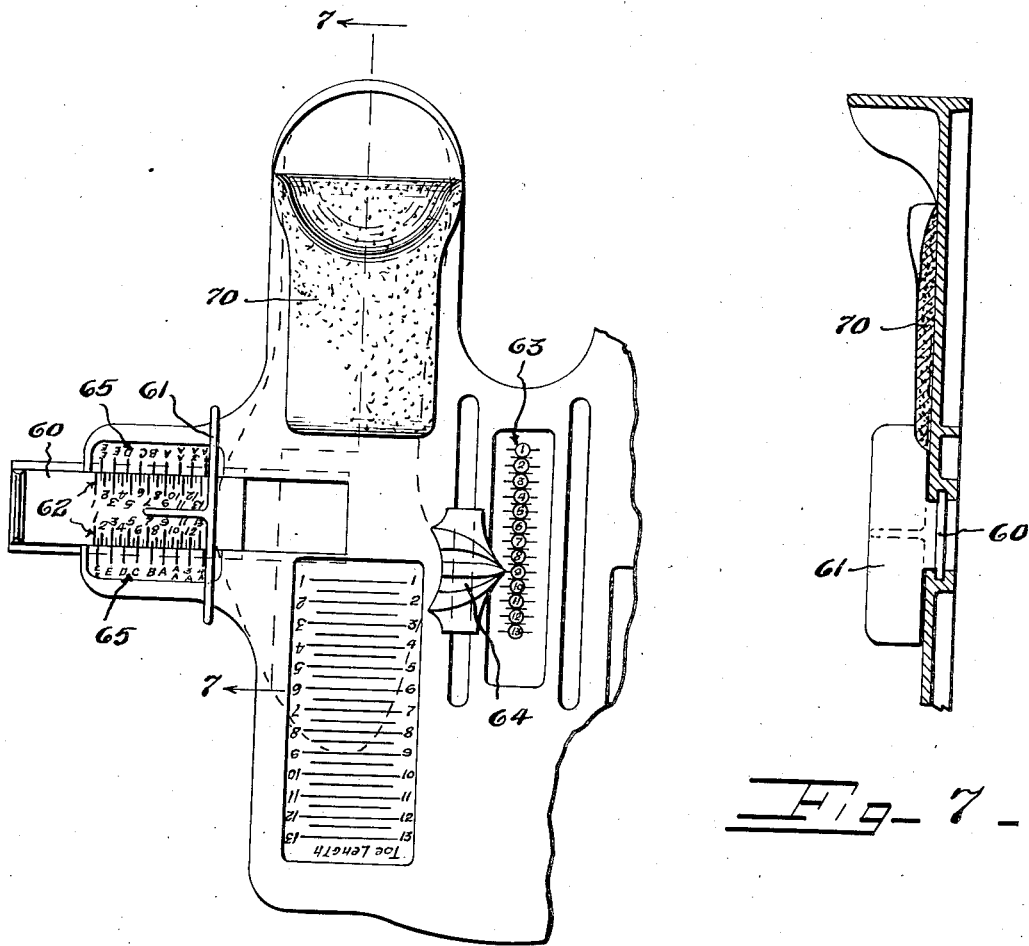
Fig-7-
Fig-6-
INVENTOR.
Charles F. Brannock.
BY
Bordell & Thompson
ATTORNEYS Patented Apr. 27, 1937

2,078,368

UNITED STATES PATENT OFFICE 2,078,368

FOOT MEASURING INSTRUMENT

Charles F. Brannock, Syracuse, N. Y.

Application December 13, 1934, Serial No. 757,348

3 Claims. (Cl. 33—3)

This invention relates to foot measuring instruments of the general type shown in my Patents Nos. 1,682,366 issued August 28, 1928 and 1,725,334 issued August 20, 1929, and has for its object a foot measuring instrument by which both feet can be measured at the same time and a ready comparison made between the measurements so that if the measurements vary, a shoe clerk, skilled in his calling, has accurate measurements to make a comparison of slightly different measurements and judge the size of the pair of shoes to accurately fit both feet.

It further has for its object a foot measuring device in which the member or slide indicating the width of the foot is shifted by the ball joint abutment through suitable motion transmitting means, when the ball joint abutment is being adjusted to the ball joint of the foot.

It further has for its object a foot measuring device of the type set forth in said patents, wherein the member or slide indicating the width of the shoe in correlation with the length as indicated by the ball joint abutment is brought against the side of the foot and the width indication taken from the graduations opposite the numerals on the slide corresponding to the reading of the ball joint abutment along its slide, in contradistinction to taking the widthwise reading from a line on the slide which comes opposite the edge of the foot when the slide is set in accordance with the reading of the ball joint abutment.

The invention consists in the novel features and in the combinations and constructions hereinafter set forth and claimed.

In describing this invention, reference is had to the accompanying drawings in which like characters designate corresponding parts in all the views.

Figure 1 is a plan view of one embodiment of this foot measuring instrument.

Figure 2 is an enlarged fragmentary plan view illustrating a double ball joint abutment.

Figure 3 is a sectional view on line 3—3, Figure 2.

Figure 4 is a plan view, partly broken away, illustrating the automatic setting of the width indicating member or slide from the ball joint abutment.

Figure 5 is a sectional view on line 5—5, Figure 4.

Figure 6 is a fragmentary plan view of a foot measuring instrument in which the width indicating member or slide is provided with an abutment which is brought up against the side of the foot and the reading taken on the scale from the foot and the reading taken on the scale from the line on the slide, which has the same numeral as that indicated by the heel-to-toe length or the ball joint abutment length, and also showing the means for preventing the foot from sliding forward from the heel abutment.

Figure 7 is a sectional view on line 7—7, Figure 6.

This foot measuring instrument comprises, generally, a base plate having heel abutments at one end and presented toward the other end with a comparatively narrow space between the portions of said plates in front of the heel abutments which form rests for the feet, right and left ball joint abutments which are operated independently of each other, these being slidably mounted on the base plate in the space between the foot rest portions, and preferably movable along a scale common to both abutments, and means for measuring or indicating the width of the feet, this means including movable elements located on opposite sides of the base plate and movable in a widthwise direction toward and from the ball joint abutments.

1 designates the base plate having heel abutments 2, 3, at one end presented toward the other end, these being spaced apart leaving a space at 4 between the portions of the plate on which the feet rest. 5 and 6 are right and left ball joint abutments, these being slidably mounted on the plate or the portion 4 thereof, and as here shown, are movable along suitable guide slots 7, 8. As, in my patents above referred to, each abutment 5, 6, is formed with a pointer 9, or 10, movable along a scale 11 provided on the base plate between the abutments.

12 and 13 are right and left members for indicating the widthwise measurement of the feet, these being slides suitably mounted in the side portions of the plate 1 and shiftable toward and from the ball joint abutments. These members 12, 13, are the same as in my patents above referred to. The plate is also provided with suitable scales 14, 15, for measuring the length of the feet from heel to toe, as in my patents referred to.

In using this instrument, it is placed on the floor or foot stool, and the person whose feet are to be fitted, places his or her feet on the plate with the heels against the abutments 2, 3. The ball joint abutments 5, 6, are then shifted to fit the ball joint. The widthwise members 12, 13, are then shifted from readings taken from the scale 11 and indicated by the pointers 9, 10 or by an average between the heel-to-toe length indicated on the scales 14, 15. For instance, suppose the ball joint abutments 5, 6 indicate 9 on the scale 11, and the heel-to-toe length indicated on the scale 14, 15, as 9, then the members 12, 13, are shifted so that the arrows point to 9 on the scales along the members 12, 13, and the lines on the members 12, 13, which are flush with the edges of the feet will indicate the width.

It will be noted that these lines are indicated by shoe width indications A, AA, B, C, D, E, etc. Also, these width members 12, 13, contain indications for children sizes as well as adults but this feature forms no part of the invention.

The general operation is fully set forth in the patents referred to.

By reason of the general arrangement of the two ball joint abutments, a comparison of the readings is readily made when both do not point at exactly the same place along the scale 11, for instance, one foot might point to 9 and the other to 10, and also discrepancies may occur on the scales 14, 15, in the heel-to-toe length, but the ball joint measurements are, however, important and when such discrepancies occur, the shoe clerk can set the members 12 and 13 to determine the width in accordance with an average based on his knowledge of shoes and shoe fitting between the two readings and fit the feet with one or two try-ons.

Owing to the arrangement of the ball joint abutments, the instrument is particularly compact and the readings easily taken and compared.

In Figure 2, both the right and left ball joint abutments constitute a single unit movable along a single scale, that is, the ball joint abutment is double.

21 designates the double ball joint abutment movable along a suitable guide 22 having a scale 23 thereon, the abutments having a sight opening 24 exposing the scale and also right and left pointers 25 and 26 extending into said opening. The opening is large enough to expose one numeral on the scale. As here shown, the guide 22 is a single strip having its intermediate portion spaced apart from the base plate 27, and the abutment 21 is formed with a passage 28 through which the guide extends. The abutment also extends into a slot 29 in the base plate under the guide 22, and is secured against dislodgment by a suitable spring clip 30 secured to the abutment and sliding along the under side of the base plate. In this form of the invention, the abutment is fitted to the ball joints of both the right and left feet at once, but if the ball joints do not measure the same, the double abutment can be fitted individually to the ball joint of each foot and a compromise made between the two readings. Ordinarily, the heel-to-toe length, and the length indicated by the ball joint would be the same, but in some cases, where the toes are cramped or deformed, the reading for the heel-to-toe length would not be accurate, and usually indicates a shorter length than the ball joint abutment while the ball joint abutment indicates invariably the proper length for a normal foot. When the measurements are much different, the different measurements serve as a guide to the shoe clerk in selecting the proper shoe and in setting the member or slide, as 12, for indicating the width.

In Figure 4, the foot measuring instrument is shown as provided with motion transmitting means between the ball joint abutment and the width indicating member or slide so that when the ball joint abutment is being set to measure the length, the width indicating measure is automatically set in accordance with the adjustment of the ball joint abutment.

In Figure 4, 40 designates the ball joint abutment adjustable along a scale 41 on the base plate 42, the abutment having a runner or strip 43 extending through a slot 44 in the base plate and to which is secured, as by a screw 45, a plate 46. This plate is provided with a suitable follower 47 which moves in an inclined or cam slot 48 in a plate or extension 49 of the indicating member or slide 50. When the ball joint abutment 40 is being manipulated or set, the slide 50 will be correspondingly moved.

In the foot measuring instrument shown in Figures 4 and 5, a width indicating abutment 51 is shown as slidably mounted in a slot 52 in the slide 50. In use, during the manipulation of the ball joint abutment 40, the member or slide 50 is shifted therewith through the follower 47 and slot 48, and when the slide 51 is brought up against the side of the foot, the width indication of the scale 53 in line with the abutment 51 indicates the width of the shoe.

In Figure 4, the width abutment 51 is shown with three pointers 51ª, 51ᵇ, and 51ᶜ coacting with the scale 53 for indicating the width for an average, thin or plump foot. The shoe clerk judges whether the foot is average, thin or plump, and when the ball joint abutment 40 is shifted to the proper position, and hence the width indicating abutment correspondingly shifted, the clerk takes the reading on the width scale 53 from the pointer 51ª, 51ᵇ or 51ᶜ, the pointer selected depending on his judgment as to the character of the foot as average, thin or plump.

In the form shown in Figure 6, the width indicating member or slide 60 carries an abutment 61 for coacting with the side of the foot and which carries scales 62 numbered in accordance with the scale 63 which coacts with the ball joint abutment 64, the calibrations 62 coacting with scales or calibrations 65 on the base plate along the slide 60. In operation, the slide 60 instead of being set in accordance with the abutment 64 is moved until the abutment 61 is against the side of the foot and then a reading is taken on the scales 65 from the calibration of the scale 62 corresponding to that pointed out by the ball joint abutment 64 on the scale 63. For instance, in Figure 6, the ball joint abutment points out number 9 on the scale 63 and when the slide 60 is shifted to move the abutment 61 against the side of the foot, the number 9 on the scale 62 is in line with the calibration of the scale 65 designated A indicating that the shoe for the foot being measured is 9—A.

The means for holding the heel of the foot against the heel plate when the person is standing on the measuring instrument, when the instrument is on the floor or a flat surface, as here shown, consists of a strip or pad of soft compressible material arranged on the base plate just in front of the position occupied by the heel and in the drawing, 70 designates a strip or pad of sponge rubber located on the base plate in front of the position occupied by the heel of the foot.

What I claim is:—

1. A foot measuring instrument comprising a base plate having a heel abutment at one end facing the other end of the plate, a movable abutment for measuring the length of the foot from the heel to the ball joint and coacting with the ball joint, a movable member for indicating the width measurement of the foot, and motion transmitting means between the ball joint abutment and the movable member for shifting the movable member in accordance with the adjustment of the ball joint abutment, and means for indicating the shoe width when said member is in its adjusted position.

2. A foot measuring instrument comprising a base plate having a heel abutment at one end facing the other end of the plate, a movable abutment for measuring the length of the foot from the heel to the ball joint and coacting with the ball joint, a movable member for indicating the width measurement of the foot and motion transmitting means between the ball joint abutment and the movable member for shifting the movable member in accordance with the adjustment of the ball joint abutment, and means for indicating the shoe width when said member is in its adjusted position, said movable member comprising a slide mounted in the base plate and having a portion extending under the base plate, the ball joint abutment having a portion extending under the base plate, one of said portions being formed with a slot inclined with respect to the movement of the slide, and the other with a follower movable in the slot.

3. A foot measuring instrument comprising a base plate having a heel abutment at one end facing the other end of the plate, means for measuring and indicating the length of the foot including a scale having calibrations, a movable abutment for measuring and indicating the width of the foot, and shiftable to coact with the side of the foot, indicating means movable with the width abutment and coacting with a scale on the base plate indicating the shoe widths, said width indicating abutment being set in accordance with the reading of the scale of the means for indicating the length of the foot, and the indicating means thereof having three pointers for indicating the width of an average, thin and plump foot.

CHARLES F. BRANNOCK.